(12) United States Patent
Ninan et al.

(10) Patent No.: US 8,773,453 B2
(45) Date of Patent: Jul. 8, 2014

(54) TECHNIQUES FOR QUANTUM DOT ILLUMINATION

(75) Inventors: Ajit Ninan, San Jose, CA (US); Scott Daly, Kalama, WA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 153 days.

(21) Appl. No.: 13/325,323

(22) Filed: Dec. 14, 2011

(65) Prior Publication Data

US 2012/0154417 A1 Jun. 21, 2012

Related U.S. Application Data

(60) Provisional application No. 61/424,199, filed on Dec. 17, 2010, provisional application No. 61/448,599, filed on Mar. 2, 2011, provisional application No. 61/486,160, filed on May 13, 2011, provisional application No. 61/486,166, filed on May 13, 2011, provisional application No. 61/486,171, filed on May 13, 2011.

(51) Int. Cl.
*G09G 5/02* (2006.01)

(52) U.S. Cl.
USPC .......................................................... 345/589

(58) Field of Classification Search
USPC .......................................................... 345/589
See application file for complete search history.

(56) References Cited

U.S. PATENT DOCUMENTS

| | | | |
|---|---|---|---|
| 5,754,159 A | 5/1998 | Wood | |
| 5,774,257 A | 6/1998 | Shibata | |
| 6,031,328 A | 2/2000 | Nakamoto | |
| 6,470,115 B1 | 10/2002 | Yonekubo | |
| 6,608,439 B1 | 8/2003 | Sokolik | |
| 6,864,626 B1 | 3/2005 | Weiss | |
| 7,126,254 B2 | 10/2006 | Nanataki | |
| 7,230,603 B2 | 6/2007 | Yamamoto | |
| 7,465,104 B2 | 12/2008 | Tokui | |
| 7,486,854 B2 | 2/2009 | Van Ostrand | |
| 7,498,534 B2 | 3/2009 | Hoyle | |

(Continued)

FOREIGN PATENT DOCUMENTS

| | | |
|---|---|---|
| CN | 1732717 | 2/2006 |
| CN | 1854857 | 11/2006 |

(Continued)

OTHER PUBLICATIONS

NanocoTechnologies "The Future of Cadmium Free QD Display Technology" Apr. 2011.

(Continued)

*Primary Examiner* — Javid A Amini
*Assistant Examiner* — Jin Ge

(57) ABSTRACT

Techniques for extracting light from a light guide are described. In some embodiments, a light source comprises a light guide configured to trap first light through total internal reflection. The light source may further comprise a plurality of light extractors configured to extract at least a portion of the first light upon establishing optical contact with the light guide. The light source is configured to control individual light extractors in the plurality of light extractors to make optical contact with the light guide. Quantum dots may be used with the light source to regenerate light, within desired frequency band, from the at least a portion of the first light.

37 Claims, 7 Drawing Sheets

(56) References Cited

U.S. PATENT DOCUMENTS

| | | |
|---|---|---|
| 7,649,594 B2 | 1/2010 | Kim |
| 7,686,493 B2 | 3/2010 | Roshan |
| 7,696,684 B2 | 4/2010 | Weiss |
| 7,733,017 B2 | 6/2010 | Shapiro |
| 7,746,423 B2 | 6/2010 | Im |
| 7,751,663 B2 | 7/2010 | Van Ostrand |
| 7,768,023 B2 | 8/2010 | Diana |
| 7,858,409 B2 | 12/2010 | Kessels |
| 7,982,812 B2 | 7/2011 | Rho |
| 7,988,311 B2 | 8/2011 | Helbing |
| 8,026,661 B2 | 9/2011 | Weiss |
| 8,035,772 B2 | 10/2011 | Kim |
| 8,075,148 B2 | 12/2011 | Nada |
| 8,164,820 B2 | 4/2012 | Cho |
| 8,210,701 B2 | 7/2012 | Igarashi |
| 8,215,815 B2 | 7/2012 | Meir |
| 8,242,679 B2 | 8/2012 | Noh |
| 8,294,168 B2 | 10/2012 | Park |
| 2004/0061708 A1 | 4/2004 | Oh |
| 2005/0093813 A1* | 5/2005 | Yamamoto et al. ............ 345/102 |
| 2006/0109682 A1 | 5/2006 | Ko |
| 2006/0121371 A1 | 6/2006 | Wu |
| 2006/0238103 A1 | 10/2006 | Choi |
| 2006/0244367 A1 | 11/2006 | Im |
| 2007/0008458 A1* | 1/2007 | Tokui et al. ...................... 349/67 |
| 2007/0029560 A1 | 2/2007 | Su |
| 2007/0096141 A1 | 5/2007 | Chen |
| 2007/0268240 A1 | 11/2007 | Lee |
| 2008/0007172 A1 | 1/2008 | Tan |
| 2008/0136758 A1 | 6/2008 | Ohta |
| 2008/0172197 A1 | 7/2008 | Skipor |
| 2008/0215279 A1 | 9/2008 | Salsbury |
| 2008/0225520 A1 | 9/2008 | Garbus |
| 2009/0039448 A1 | 2/2009 | Chuang |
| 2009/0059554 A1 | 3/2009 | Skipor |
| 2009/0091689 A1 | 4/2009 | Rho |
| 2009/0109517 A1* | 4/2009 | Cho et al. ...................... 359/290 |
| 2009/0162011 A1* | 6/2009 | Coe-Sullivan et al. ......... 385/31 |
| 2009/0180055 A1 | 7/2009 | Kim |
| 2009/0190095 A1 | 7/2009 | Ellinger |
| 2009/0194774 A1 | 8/2009 | Huang |
| 2009/0196014 A1 | 8/2009 | Hsiao |
| 2009/0213294 A1 | 8/2009 | Jung |
| 2009/0231831 A1 | 9/2009 | Hsiao |
| 2010/0079704 A1 | 4/2010 | Cho |
| 2010/0084674 A1 | 4/2010 | Paetzold |
| 2010/0102251 A1 | 4/2010 | Ferrini |
| 2010/0102340 A1 | 4/2010 | Ooya |
| 2010/0117997 A1 | 5/2010 | Haase |
| 2010/0123839 A1 | 5/2010 | Lu |
| 2010/0155749 A1 | 6/2010 | Chen |
| 2010/0172138 A1 | 7/2010 | Richardson |
| 2010/0177091 A1* | 7/2010 | Hioki et al. .................... 345/214 |
| 2010/0193806 A1 | 8/2010 | Byun |
| 2010/0208172 A1 | 8/2010 | Jang |
| 2010/0208493 A1 | 8/2010 | Choi |
| 2010/0214282 A1* | 8/2010 | Whitehead et al. ........... 345/214 |
| 2010/0246160 A1 | 9/2010 | Ito |
| 2010/0283036 A1 | 11/2010 | Coe-Sullivan |
| 2010/0283072 A1 | 11/2010 | Kazlas |
| 2011/0089809 A1* | 4/2011 | Noh .............................. 313/483 |
| 2011/0205251 A1 | 8/2011 | Auld |
| 2011/0299011 A1 | 12/2011 | Weiss |
| 2011/0312116 A1 | 12/2011 | Weiss |
| 2011/0317097 A1 | 12/2011 | Kim |
| 2012/0050632 A1 | 3/2012 | Shih |
| 2012/0154417 A1 | 6/2012 | Ninan |
| 2012/0274882 A1 | 11/2012 | Jung |
| 2013/0201661 A1* | 8/2013 | Mehrle ......................... 362/97.1 |
| 2013/0208508 A1* | 8/2013 | Nichol et al. ................. 362/612 |
| 2013/0215136 A1 | 8/2013 | Jiao |
| 2013/0335677 A1 | 12/2013 | You |

FOREIGN PATENT DOCUMENTS

| | | | |
|---|---|---|---|
| CN | 101243557 | 8/2008 | |
| CN | 101512697 | 8/2009 | |
| EP | 1579733 | 9/2005 | |
| EP | 1922763 | 5/2008 | |
| JP | 2-78393 | 3/1990 | |
| JP | 2004-325647 | 11/2004 | |
| JP | 2008-538145 | 10/2008 | |
| JP | 2009-251129 | 10/2009 | |
| KR | 2008-0041780 | 5/2008 | |
| KR | 2008-0012246 | 2/2011 | |
| KR | 2011-0072210 | 6/2011 | |
| KR | 2012-0078883 | 7/2012 | |
| KR | 2013-0000506 | 1/2013 | |
| NL | WO2006/046168 | * 5/2006 | ............ G02F 1/1347 |
| WO | 2004/060024 | 7/2004 | |
| WO | 2006/107720 | 10/2006 | |
| WO | 2007/020556 | 2/2007 | |
| WO | 2007/114918 | 10/2007 | |
| WO | 2009/041594 | 4/2009 | |
| WO | 2011/031802 | 3/2011 | |

OTHER PUBLICATIONS

Quantum Dot LCD HDTV, Dec. 31, 2009.

Nanosys and LG Close to Bringing Quantun Dot Technology to LCD Displays, Nov. 4, 2010.

Green, Kate, "How Quantum Dots Will Make LCDs Better", Dec. 9, 2009, QD Vision.

* cited by examiner

TECHNIQUES FOR QUANTUM DOT ILLUMINATION

CROSS-REFERENCE TO RELATED APPLICATIONS

This Application claims benefit of priority to related, U.S. Provisional Patent Application No. 61/424,199 filed on Dec. 17, 2010; U.S. Provisional Patent Application No. 61/448,599 filed on Mar. 2, 2011; U.S. Provisional Patent Application No. 61/486,160 filed on May 13, 2011; U.S. Provisional Patent Application No. 61/486,166 filed on May 13, 2011; and U.S. Provisional Patent Application No. 61/486,171 filed on May 13, 2011, which are hereby incorporated herein by reference for all purposes as if fully set forth herein.

TECHNOLOGY

The present invention relates generally to display systems, and in particular, to quantum dots in display systems.

BACKGROUND

A display system may contain light valves (e.g., LCD) and color filters (e.g., imparting red, green and blue colors in a RGB system) that regulate brightness levels and color values of pixels as the pixels are being illuminated by a light source, such as back light units (BLUs). Typically, light sources such as fluorescent lights or light-emitting diodes (LEDs) illuminate pixels on display panels. The light illuminating the pixels is attenuated by RGB color filters and liquid crystal materials.

Engineering wide color gamut and high luminance has been recognized as a very difficult endeavor by many display manufactures. It is difficult for a pixel or subpixel in a display system to accurately express accurate luminance values and color information. For example, light with different colors and luminance levels may bleed into a portion of a display panel from neighboring portions of the display panel.

Further, different types of light emitters emit light of broad ranges of wavelengths for which display systems are not optimized, image inversions, restrictive viewing angles and undesirable color representations and tinges may occur in the display systems so that displayed images suffer from poor quality or a limited color gamut.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE POSSIBLE EMBODIMENTS

Figure 1A:
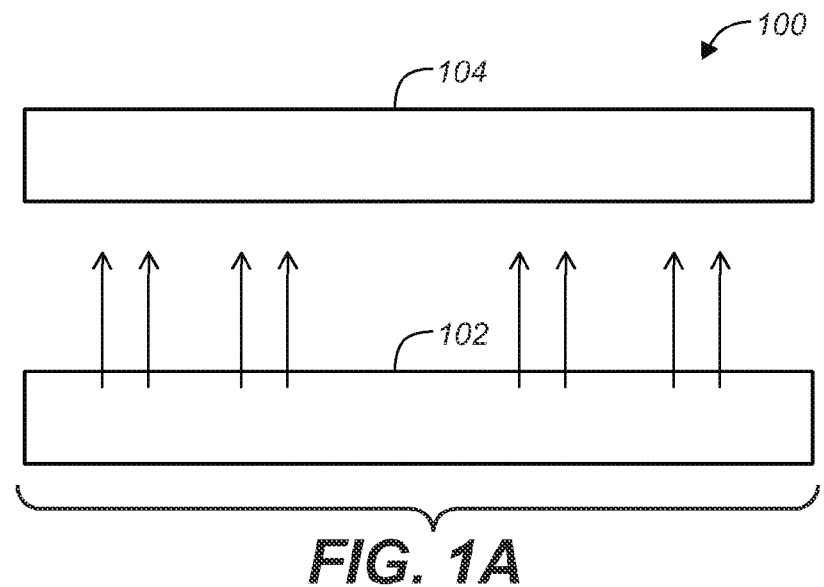
FIG. 1A illustrates an example display system, according to an embodiment of the invention.

Example possible embodiments, which relate to quantum dot light sources, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. STRUCTURE OVERVIEW
3. EXAMPLE LIGHT SOURCE
4. OPERATION RELATED TO OPTICAL CONTACT
5. LIGHT EXTRACTORS
6. 3D DISPLAY APPLICATIONS

7. LIGHT SOURCE CONTROL LOGIC
8. EXAMPLE PROCESS FLOW
9. IMPLEMENTATION MECHANISMS—HARDWARE OVERVIEW
10. EQUIVALENTS, EXTENSIONS, ALTERNATIVES AND MISCELLANEOUS

1. General Overview

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

In some possible embodiments, a light source comprising a plurality of light extractors and a light guide may be configured in a system. Each light extractor may be assigned to provide illumination on a portion of a first surface of a layer outside the light source. For example, the light source may be used in a display system to illuminate a light valve layer which may be an optical layer that modulates light output to render images in various levels of resolutions. In some embodiments, the light source may directly render images without other light modulation layers that modulate light output on an individual pixel basis.

In some embodiments, the light guide may form a first part of the light source receiving and trapping first light emitted by light emitters (e.g., in a side light unit). The light extractors may form a second part of the light source and may be disposed adjacent to a surface (e.g., bottom surface; away from a viewer at the top) of the light guide. Possible embodiments include light sources that are configured to move only individual portions of the light guide, to move only individual light extractors, or to move both individual portions of the light guide and individual light extractors in a cooperative manner to create or to remove optical contacts between the light extractors and the light guide.

In some embodiments, when no optical contacts are made with light extractors, the light guide confines first light from light emitters (such as side light unit comprising LEDs) within the light guide through total internal reflection. Under techniques described herein, light otherwise trapped in the light guide is extracted through an optical contact between the light guide and a light extractor.

In some embodiments, first light injected into the light guide may be emitted by UV, blue, quantum dot rails, quantum dot strips, or other light emitters. In some embodiments, the system, or the light source therein, is configured to control each optical contact between light extractors and the light guide on an individual basis. The motion of a light extractor or a portion of the light guide may be effectuated with pneumatic force, mechanical force, gravitational force, or electromagnetic field-based force.

For example, in a display system, when no image is to be displayed, the light extractors and the light guide may have no or little optical contact. Thus, no or little light comes out of the light guide, or the light source. On the other hand, when the display system is to render an image, relatively bright areas of the image as rendered by the light valve layer may be illuminated with relatively strong light, while relatively dim areas of the image may be illuminated with relatively weak light. In a relatively bright area, a relatively large number of optical contacts may be established between the light extractors and light guide. On the other hand, in a relatively dim area, a relatively small number of optical contacts may be established between the light extractors and light guide. Other ways of controlling the intensity of extracted light may be used in place of or in conjunction with the techniques described herein. For example, time durations of optical contacts may be controlled so that a relatively bright area of an image to be rendered corresponds to a relatively long time duration of optical contacts and a relatively dim area of an image to be rendered corresponds to a relatively short time duration of optical contacts.

The ability of a light extractor described herein to extract light may be configured through a relationship between refractive indexes of the optical materials used in making the light guide and the light extractor. For example, in the vicinity of an optical contact between the light guide and the light extractor, the refractive indexes of the light guide and the light extractor may be configured to cause a relatively large refraction/transmission rather than a reflection. In some embodiments, in the vicinity of an optical contact, the refractive index of the light guide is much closer to the refractive index of the light extractor than to the refractive index of air or vacuum. The ability of a light extractor described herein to extract light may be enhanced by other properties of the light guide (e.g., a conic structure or another structure with a bottom minor surface) and the light extractor.

The light guide and/or the layer comprising the light extractors may or may not form a contiguous, non-perforating surface. In some embodiments, the light guide and/or the layer comprising the light extractors may comprise at least two disjoint geometric shapes separated by an intershape gap. As used herein, a gap may refer to a spatial void or a space filled with air or other types of materials that are different from that of disjoint geometric shapes separated by the gap. For the purpose of the present invention, other discrete or non-discrete, perforated or non-perforated, curved or non-curved, regular or irregular shapes may be used to carry/host portions of the light guide and/or the light extractors.

In some embodiments, the light extracted from the light guide may be used to provide illumination to other components outside the light source. In some other embodiments, quantum dots may be deposited around optical contacts as described herein to generate second light using extracted light. The light source may be configured to provide illumination to other components outside the light source with the second light, instead of, or in addition to, any extracted first light.

In various possible embodiments, quantum dots may be disposed with the light guide and the light extractors in various possible ways. For example, quantum dots may be coated on a top surface, a bottom surface, or both top and bottom surfaces of the light guide. Quantum dots also may be embedded within the light guide. Similarly, quantum dots may be coated on a top surface, a bottom surface, or both top and bottom surfaces of a light extractor. Additionally and/or alternatively, quantum dots may be disposed with the light guide or the light extractor through a film, a sheet, etc., that is disposed near or at the light guide or the light extractors.

Quantum dots may also be distributed in an unmixed pattern or in a mixed form. In some embodiments, quantum dots distributed in a mixed form may generate a relatively white light (which may be related to D65 under Rec. 709, or D50 under P3, or another standard-based or non-standard-based white point). In some other embodiments, quantum dots distributed in an unmixed pattern may generate separate primary colors which may be used to support a wide range of colors in a color gamut or to support specific colors (e.g., highly saturated colors that are difficult to accomplish with white light).

In some embodiments, quantum dots may be relatively uniformly distributed. In some other embodiments, quantum dots may form groups of linear or non-linear patterns (e.g., arranged in a layer in a triangular pattern).

A light source described herein may or may not be a part of a display system. In embodiments in which the light source is used with a display system, additionally and/or optionally, a distinct set of quantum dots with all the primary colors to support rendering color images in a color space may be used to create a left image, while another distinct set of quantum dots with all the primary colors to support rendering color images in the color space may be used to create a right image. The quantum dots in the two distinct sets may be so configured that light wavelengths produced by one distinct set of quantum dots have no or little overlap with light wavelengths produced by the other distinct set of quantum dots. Passive 3D glasses may be used with the display system to view these images in 3D display applications. For example, the left perspective of the 3D glasses may be configured to transmit only the light wavelengths in the left image, while the right perspective of the 3D glasses may be configured to transmit only the light wavelengths in the right image. Thus, under techniques described herein, costly active synchronization between 3D glasses and image rendering may be avoided.

In some embodiments, a display system comprising a light source described herein may further comprise light source control logic configured to determine, based on image data, which light extractors are to be in optical contact with the light guide. Additionally and/or optionally, the display system may comprise sampling logic configured to estimate desired illumination on a portion of a plane based on pixel values in image data.

In some embodiments, a method comprises providing a light source described herein in a display system.

In some possible embodiments, mechanisms as described herein form a part of a display system, including, but not limited to: a handheld device, game machine, television, laptop computer, netbook computer, cellular radiotelephone, electronic book reader, point of sale terminal, desktop computer, computer workstation, computer kiosk, PDA, various other kinds of terminals and display units, etc.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Structure Overview

FIG. 1A illustrates an example display system 100, according to an embodiment of the invention. Display system 100 comprises a light source 102. Light source 102 may comprise an optical system comprising one or more minors, lenses or other optical elements which cooperate to deliver light to the rest of display system 100.

In the illustrated embodiment, light from light source 102 is directed toward a light valve layer 104. Light source 102 may provide a light illumination field on light valve layer 104. A light illumination field described herein refers to a spatial power distribution of light; the spatial power distribution is controlled under techniques described herein, for example, based on image data for one or more images that are being rendered by the display system. Light valve layer 104 comprises an array of individually addressable light valves. Light valve layer 104 may comprise, for example, a liquid crystal display (LCD) layer. Display driver circuitry or control logic (not shown in FIG. 1) controls individual light valves of light valve layer 104 according to image data which defines one or more images being rendered.

In some possible embodiments, display system 100 may comprise further optical, electrical, or mechanical elements including one or more additional light valve layers with the same or different spatial resolutions, processors, controllers, data communication interfaces, software components, etc. For example, display system 100 may comprise a diffuser and/or a collimator configured to cause light to be relatively evenly distributed in (e.g., relatively flattened light intensity with relatively sharp falloffs beyond) a local spatial area and to travel through light valves in the light valve layer 104 in a direction which is generally normal (e.g., perpendicular) to a viewer facing a surface (e.g., the top surface of light valve layer 104) of display system 100.

Display system 100 may be a color display system. This may be achieved in various ways including: making light valves in light valve layer 104 color light valves; providing a plurality of different light valves operating in parallel on different colors; providing dye-based only, quantum-dot-based only, part dye/part quantum-dot-based color filters in the light path of a light valve, etc.

In some possible embodiments, a display panel (e.g., an LCD type) has a plurality of pixels each comprising a number of colored sub-pixels. For example, using a red green blue (RGB) color space, each pixel may comprise three sub-pixels, one associated with a red filter, one associated with a green filter and one associated with a blue filter. A color filter described herein may be embedded, coated, deposited, or other disposed with a light valve.

3. Example Light Source

Figure 1B:
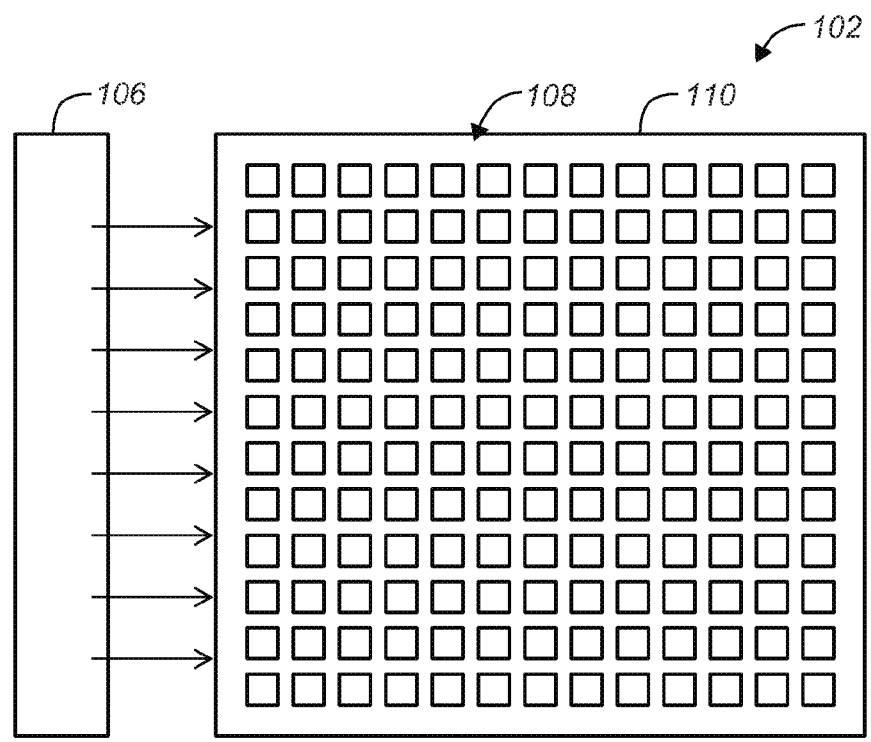
FIG. 1B illustrates an example light source comprising a light injector, a light guide, and a plurality of light extractors, in accordance with some possible embodiments of the present invention.

FIG. 1B illustrates an example light source (e.g., 102) comprising a light injector (e.g., 106), a light guide (e.g., 110), and a plurality of light extractors (e.g., 108), in accordance with some possible embodiments of the present invention. A plurality of light extractors in a light source as described herein may be arranged in a geometric shape such as a rectangle as illustrated. Another geometric shape such as ellipse, triangle, quadrilateral, etc., or a combination thereof, may also be used to arrange the light extractors on any of the display panels described herein.

In some embodiments, light injector (106) may be provided in the form of a plurality of light emitting diodes (LEDs). In some embodiments, light injector (106) may be provided in the form of a quantum dot strip or rail that converts/regenerates light when illuminated by other visible or invisible light with light wavelengths in one or more configured ranges of light wavelengths. Other types of light injectors may include, but are not limited only to, fluorescent light emitters, halogen light emitters, etc.

Light guide (110) may be configured to receive light injected by light injector (106) and to keep light within light guide (110) until light is redirected towards light valve layer by one or more light extractors among the plurality of light extractors (108). As used herein, a light guide (e.g., 110) may be an optical structure (e.g., a waveguide, a plate, a substrate, etc.) that comprises substantially reflective surfaces for injected light when not contacted by light extractors. In some embodiments, the substantially reflective surfaces may be provided by (e.g., metallic or non-metallic) reflectors. In some embodiments, the substantially reflective surfaces may come about at a surface of the light guide (110) because of the difference between refractive indexes inside and outside the light guide (110). In some embodiments, light guide (110) may comprise one or more reflectors such as enhanced specular reflectors (ESR). Additionally and/or optionally, under techniques described herein, one, two or more ways of trapping light within a light guide (110) may be used together at the same time.

In some embodiments, a light extractor described herein is configured to extract a portion of trapped light from light guide (110) and to redirect the extracted light towards light valve layer (104). In some embodiments, a light extractor described herein is configured to generate second light from the extracted portion of light, and to direct the second light toward light valve layer (104). In these embodiments, the second light may be generated by quantum dots, quantum wells, or another suitable light regeneration/conversion material.

In some embodiments, an individual light extractor and/or a light guide (e.g., 110) may be controlled by a display system (e.g., 100), or light source (102) therein, to make or not to make optical contact between the individual light extractor and light guide (110). Upon optical contact between light guide (110) and a light extractor in the plurality of light extractors (108), a portion of light may be extracted from light guide (110). For example, a light extractor described herein may be made of an optical material with a refractive index that causes the area of contact to be no longer total reflective.

In various embodiments, the optical contact of one or more light extractor with light guide (110) may be controlled based at least in part on a local luminance value such as an average luminance value, a maximum luminance value, etc., calculated for a subset of pixels in an image frame that is being rendered, wherein pixel values of the subset of pixels are to be rendered by modulated light transmitted through a subset of light valves and wherein the subset of light valves are illuminated by the redirected light extracted by the one or more light extractors.

In some embodiments, a light extractor and/or a light guide described herein is movable. The motion of a light extractor and/or a light guide may be effectuated with one or more mechanical, electro-magnetic, or gravitational forces. In an example, pressure from air or a lever may be used to cause the motion of a light extractor to make or not to make optical contact with light guide (110). In another example, a light extractor may carry an electric or magnetic charge that may be acted on by an electromagnetic field to cause the motion of the light extractor. Alternatively and/or additionally, pressure from air or a lever, electromagnetic field, etc. may be used to cause the motion of a portion of a light guide (e.g., 110) to make or not to make optical contact with an individual light extractor.

4. Operation Related to Optical Contact

Figure 2A:
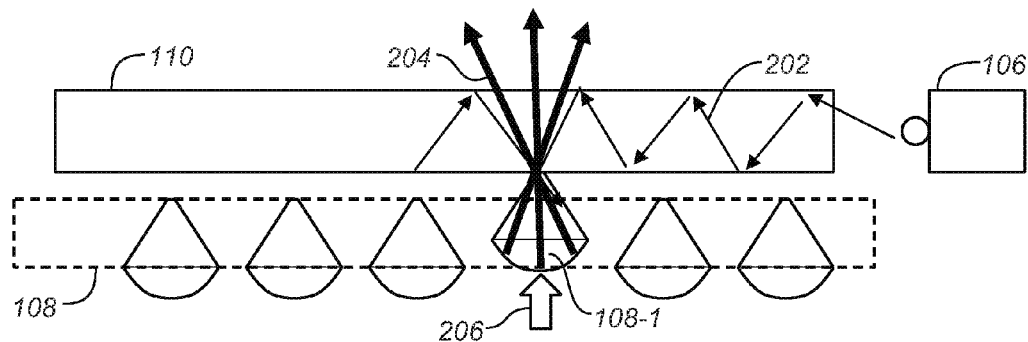
FIG. 2A illustrates an example operation of optical contact between an individual light extractor in a plurality of light extractors and a light guide which receives light from a light injector, in accordance with some possible embodiments of the present invention.

FIG. 2A illustrates an example operation of optical contact between an individual light extractor (e.g., 108-1) in a plurality of light extractors (e.g., 108) and a light guide (e.g., 110) which receives light (202) from a light injector (e.g., 106), in accordance with some possible embodiments of the present invention. In some possible embodiments, the light injector may be a side light unit (SLU). In various embodiments, light extracted by the light extractors (108) from the light guide (110) or light regenerated at or near optical contacts between the light guide (110) and the light extractors (108) may be used as a light source, or may alternatively directly render images without other light modulation layers that modulate light output on an individual pixel basis.

The plurality of light extractors (108) such as cones, prisms, triangular shapes, rectangular shapes, etc., may be disposed near light guide (110). Each of the light extractors may be individually controlled to make contact with light guide (110). Light from the SLU may be of a relatively oblique angle and may be substantially (e.g., 95%, 98%, or another percentile) trapped inside light guide (110) by total internal reflection. Upon touching light guide (110) by a light extractor (e.g., 108-1), a portion of the light, otherwise trapped, may be extracted through the contacting tip portion of the light extractor (108-1). The optical shape and properties of the light extractor (108-1) may be designed so as to reflect the extracted light toward a viewer (or a light valve layer such as LCD). Because the incidental angle of the reflected light from the light extractor (108-1) is no longer oblique, the light from the light extractor (108-1) may pass through light guide (110). In some possible embodiments, techniques described herein may be used to provide support for local dimming in which individual portions (each comprising a subset of pixels) of a light valve layer (e.g., 104) may be differently illuminated based on image data that is being rendered in the individual portions of the light valve layer (104).

In some possible embodiments, a force (206) may be applied to an individual light extractor (such as 108-1) to cause an optical contact between the individual light extractor (108-1) and light guide (110). An individual light extractor (e.g., 108-1) may be controlled with mechanical or electromagnetic force. For example, a push pin, a mechanical device, air pressure or inductive electrical force may be exerted to cause a light extractor to move and make or not make contact with another surface such as a surface of a light guide (e.g., 110). As a result of the optical contact, second light (204) may be emitted toward a light valve layer (e.g., 104 of FIG. 1A) and further toward a viewer (located at the top of FIG. 2A looking toward light guide).

Under techniques described herein, quantum dots may be disposed with a light extractor and/or a light guide and/or an SLU or BLU. In an example, quantum dots may be coated or embedded with light guide (110). Additionally and/or alternatively, quantum dots may be coated or embedded with some or all light extractors (108). Additionally and/or alternatively, quantum dots may be disposed with light extractors (108) and/or light guide (110) using a quantum dot film, a quantum dot sheet, a quantum dot substrate, etc.

Figure 2B:
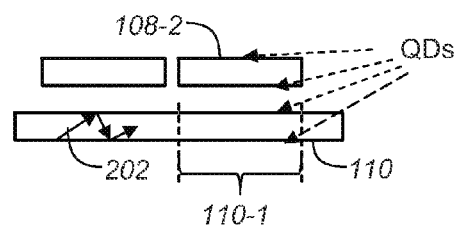
FIG. 2B and FIG. 2C illustrate an example operation of optical contact between an individual light extractor in a plurality of light extractors and a portion of a light guide, in accordance with some possible embodiments of the present invention.
Figure 2C:
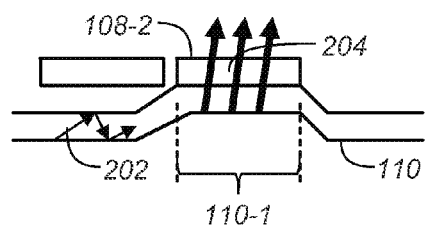

FIG. 2B and FIG. 2C illustrate an example operation of optical contact between an individual light extractor (e.g., 108-2) in a plurality of light extractors (e.g., 108 of FIG. 1B) and a portion (110-1) of a light guide (e.g., 110), in accordance with some possible embodiments of the present invention. In various embodiments, light extracted by the light extractors (108) from the light guide (110) or light regenerated at or near optical contacts between the light guide (110) and the light extractors (108) may be used as a light source, or may alternatively directly render images without other light modulation layers that modulate light output on an individual pixel basis. In some possible embodiments, as illustrated in FIG. 2B and FIG. 2C, the light extractors (108) may be placed above the light guide (110), instead of below a light guide as illustrated in FIG. 2A. In some possible embodiments, as illustrated in FIG. 2B and FIG. 2C, portions of the light guide (110) may be controlled to move, relative to the light extractors, to make or not to make contact with individual light extractors. As illustrated in FIG. 2B, the portion (110-1) of the light guide (110) may be moved to a first position that makes no contact with the individual light extractor (108-2); the first position may be the natural position of the portion (110-1) when no force is exerted. In contrast, as illustrated in FIG. 2C, the portion (110-1) of the light guide (110) may be moved to a second position that makes contact with the individual light extractor (108-2); the second position may be a position of the portion (110-1) when a force (e.g., static, pneumatic, etc.) is exerted. When the individual light extractor (108-2) makes contact with the light guide (110), second light (204) may be produced from trapped light (202) to illuminate a light valve layer (e.g., 104).

Figure 2D:
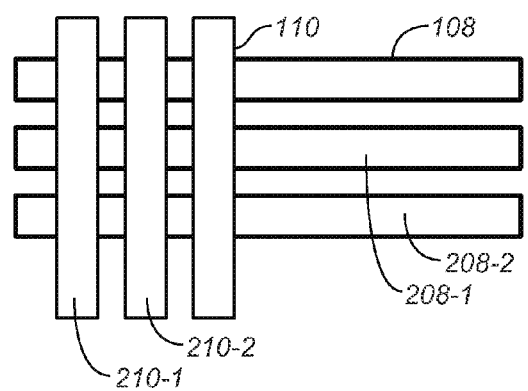
FIG. 2D illustrates an example light guide made up of non-contiguous light guide strips separated by inter-strip gaps, in accordance with some possible embodiments of the present invention.

For the purpose of illustration, it has been illustrated that a light guide may be contiguous and non-perforated, while a plurality of light extractors may be individual discrete shapes arranged in a lattice or matrix. It should be noted that the present invention is not so limited. In an example embodiment, as illustrated in FIG. 2D, a light guide may be made up of non-contiguous light guide strips separated by inter-strip gaps. Alternatively and/or optionally, light extractors may be provided with shapes other than discrete shapes in a lattice of matrix. For example, as illustrated in FIG. 2D, light extractors may be embedded with light redirecting strips crossing the light guide strips. Crossed portions may be configured to be statically attracted to each other to produce light extraction. Quantum dots (QD; e.g., mixed RGB quantum dots, or individual R, G or B quantum dots) may be disposed with the light guide and/or the light extractors (e.g., on one or more surfaces of the light guide and/or the light extractors). In this example, the plurality of light extractors (108) may refer to a plurality of portions of the light redirecting strips with which portions the light guide are configured to make contact. Therefore, these and other ways of configuring light extractors are within the scope of the present invention.

5. Light Extractors

Figure 3A:
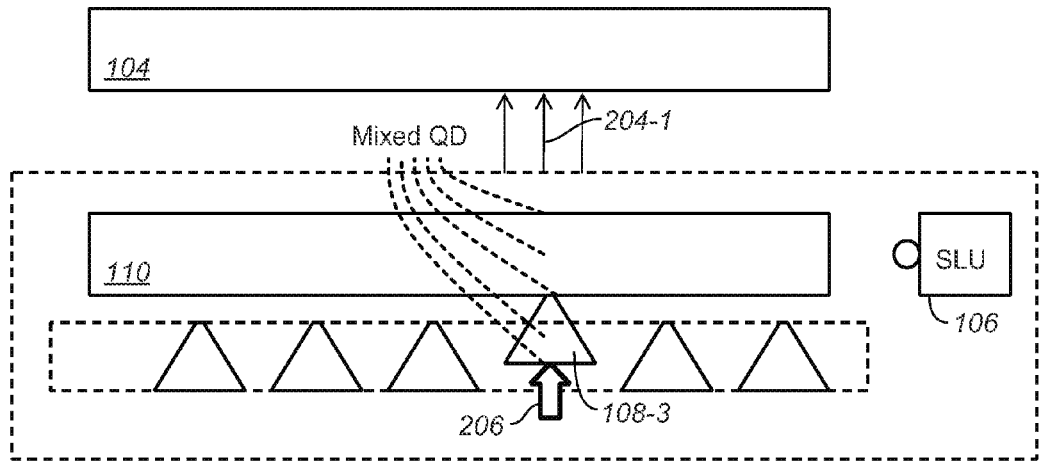
FIG. 3A illustrates an example light extractor among a plurality of light extractors around which mixed primary color quantum dots are disposed, in accordance with some possible embodiments of the present invention.

FIG. 3A illustrates an example light extractor (e.g., 108-3) among a plurality of light extractors (e.g., 108 of FIG. 1B) around which mixed primary color quantum dots are disposed, in accordance with some possible embodiments of the present invention. In some possible embodiments, a display system described herein may support a color space comprising three or more primary colors (e.g., R, G and B as primary colors). Each of the three or more primary colors may be emitted by a different group in three or more groups of quantum dots. In some possible embodiments, at or near a light extractor (e.g., 108-3), quantum dots from two or more groups of the three or more groups may be mixed. In an example, quantum dots at or near a light extractor (108-3) may comprise RGB quantum dots. The composition of the mixed quantum dots may be configured to provide a white point. The white point may be D65 under Rec. 709, D50 under P3, or another type of white point (including but not limited to a standard-based or non-standard-based white point). The portion of second light produced with first light from a SLU (e.g., 106) upon optical contact between the light extractor (108-3) and a portion of a light guide (e.g., 110) may be configured to illuminate a portion (e.g., 204-1) of a light valve layer (104). In some embodiments, the portion of second light may be configured as a part of substantially uniform illumination on the light valve layer (104). In some other embodiments, second light from the light extractors (108) may be configured to support local dimming. For example, the portion (204-1; comprising a subset of pixels) of the light valve layer (104) may be differently illuminated, relative to other portions (or pixels) of the light valve layer (104), based on image data that is being rendered in the portion of the light valve layer (104). In various embodiments, light extracted by the light extractors (108) from the light guide (110) or light regenerated at or near optical contacts between the light guide (110) and the light extractors (108) may be used as a light source, or may alternatively directly render images without other light modulation layers that modulate light output on an individual pixel basis.

Figure 3B:
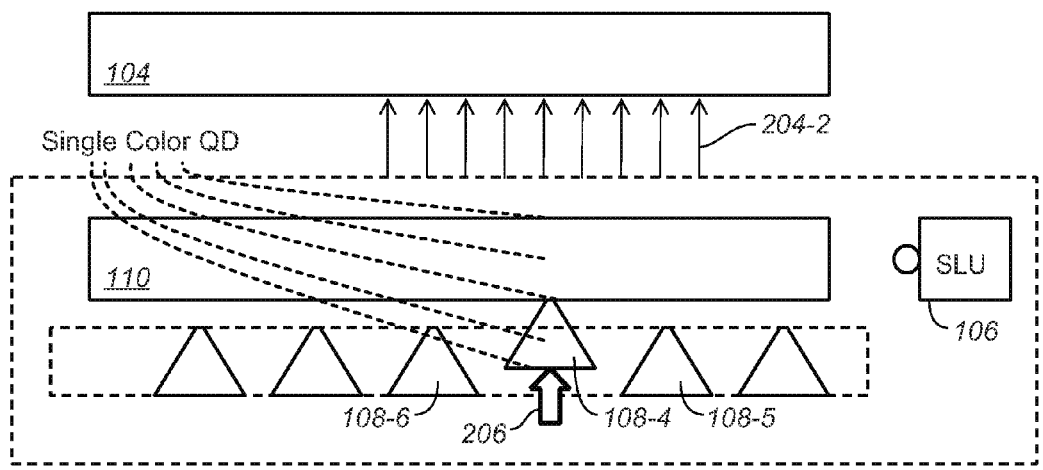
FIG. 3B illustrates an example group of light extractors among a plurality of light extractors, in accordance with some possible embodiments of the present invention.

FIG. 3B illustrates an example group of light extractors (e.g., 108-4, 108-5 and 108-6) among a plurality of light extractors (e.g., 108 of FIG. 1B), in accordance with some possible embodiments of the present invention. In an example display system that supports a RGB color space, quantum dots around or with a light extractor (108-4, 108-5, or 108-6) may comprise single color quantum dots (e.g., green, red, or blue quantum dots). The portion of second light produced upon optical contact between the light extractor (108-4) and a portion of a light guide (e.g., 110) may be configured to illuminate a portion (204-2) of a light valve layer (104) with a particular color (e.g., green). The portion of second light produced upon optical contact between the light extractor (108-5) and the light guide (110) may be configured to illuminate the portion (204-2) of the light valve layer (104) with a second different color (e.g., blue). The portion of second light produced upon optical contact between the light extractor (108-6) and the light guide (110) may be configured to illuminate the portion (204-2) of a light valve layer (104) with a third different color (e.g., red). In some possible embodiments, optical components such as diffusers, collimators, reflectors, mirrors, bumpy metallic surfaces, etc. may be used under techniques herein to direct illumination from each light extractor of a group of light extractors (108-4, 108-5, and 108-6) to the same portion (204-2) of the light valve layer (104).

In some embodiments, second light produced by the light extractors (108) may be configured to provide substantially uniform illumination on the light valve layer (104). In some other embodiments, second light produced by the light extractors (108) may be configured to support local dimming for specific colors (e.g., red, green, and blue). For example, the portion (comprising a subset of pixels) of the light valve layer (104) may be differently illuminated, relative to other portions of the light valve layer (104), based on image data that is being rendered in the portion of the light valve layer (104). Furthermore, the portion of the light valve layer (104) may be differently illuminated for a specific color (e.g., green), relative to other colors (e.g., red and blue), based on color specific image data that is being rendered in the portion of the light valve layer (104).

In some embodiments, the intensity of each color may be regulated by the number of optical contacts between specific color light extractors and the light guide (110). For example, the sampling of image data may indicate that a maximum pixel value for a specific color (e.g., green) in the portion (204-2) of the light valve layer (104) may be 100. A light source controller in the display system may calculate, based on the maximum pixel value for the green color, how many light extractors of a specific color (green in the present example) are needed to make optical contacts with the light guide (110) in order to provide an appropriate intensity of green light corresponding to the maximum pixel value for the green color.

In some embodiments, the intensity of each color may be regulated by a time duration of optical contact between a specific color light extractor and the light guide (110). For example, the sampling of image data may indicate that a maximum pixel value for a specific color (e.g., green) in the portion (204-2) of the light valve layer (104) may be 100. A light source controller in the display system may calculate, based on the maximum pixel value for the green color, a time duration of optical contact between the green light extractor (108-4) and the light guide (110) in order to provide an appropriate intensity of green light corresponding to the maximum pixel value for the green color.

For the purpose of illustration, it has been described that the maximum pixel value for a specific color for a subset of pixels on a light valve layer may be used to determine how many optical contacts and/or how long a time duration is.

Other measures other than the maximum pixel value may be used in such determination. In various possible embodiments, a display system may be configured to use the average pixel value, 75% of the maximum value, 95% of the maximum value, twice the average pixel value, or another value computed based on image data, to determine the number of optical contacts and/or the length of a time duration herein.

In some embodiments, light extractors with other colors, in addition to primary colors in the color space supported by the display system, may be used to produce these other colors (e.g., saturated colors) in order to support a wide color gamut.

In some possible embodiments, two (e.g., 108-4 and 108-5) or more light extractors in a group of light extractors (e.g., 108-4, 108-5, and 108-6) may have an overlapping time duration in which the two (108-4 and 108-5 in the present example) or more light extractors concurrently make optical contacts with the light guide (110). In some possible embodiments, no two light extractors in a group of light extractors may have an overlapping time duration. For example, different color light may provide illumination to the same portion (e.g., 204-2) of a light valve layer (104) in a time sequential manner.

It should be noted that, as illustrated in FIG. 2B and FIG. 2C, optical contacts as illustrated in FIG. 3A may be caused alternatively by moving portions of a light guide (110), instead of by moving light extractors.

In various possible embodiments, quantum dots (QD) described herein, whether of a single primary color or a mixture of primary colors, may be disposed with the light guide (104) and/or the light extractor (108-3). In an example, at least a portion of the quantum dots may be disposed on one or more surfaces of the light guide (104) and/or the light extractor (108-3). In a particular embodiment, at least a portion of quantum dots may be located underneath, on, or above the viewer facing top surface of the light guide (104).

Figure 3C:
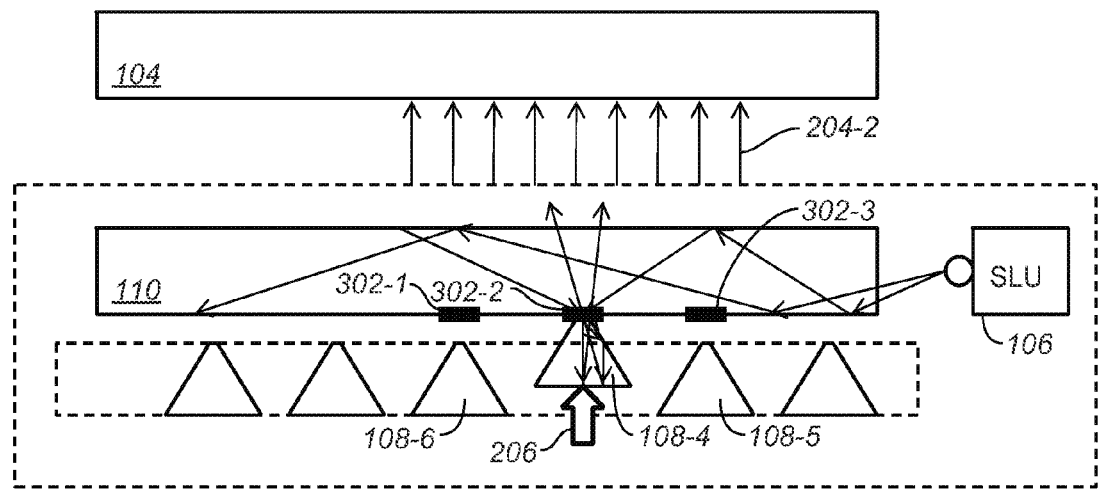
FIG. 3C illustrates an example group of light extractors among a plurality of light extractors, in accordance with some possible embodiments of the present invention.

FIG. 3C illustrates an example group of light extractors (e.g., 108-4, 108-5 and 108-6) among a plurality of light extractors (e.g., 108 of FIG. 1B), in accordance with some possible embodiments of the present invention. In various embodiments, light extracted by the light extractors (108) from the light guide (110) or light regenerated at or near optical contacts between the light guide (110) and the light extractors (108) may be used as a light source, or may alternatively directly render images without other light modulation layers that modulate light output on an individual pixel basis. Under techniques described herein, quantum dots may be distributed or disposed at or near an optical contact area between a light extractor and a light guide. For example, quantum dots may be on a surface of the light guide, on a surface of the light extractor, on an opposing surface, of the light extractor or light guide, away from the optical contact area, in the interior of the light extractor or light guide, etc.

In an example display system that supports a RGB color space, quantum dots may be coated or otherwise disposed in contact areas (e.g., 302-1, 302-2 and 302-3), on a surface of a light guide (110), with light extractor (108-4, 108-5 and 108-6, respectively, in the present example). Each of the contact areas (e.g., each of 302-1, 302-2 and 302-3) may comprise single color quantum dots (e.g., green, red, or blue quantum dots). The portion of second light produced upon optical contact between the light extractor (108-4) and a portion of a light guide (e.g., 110) may be configured to illuminate a portion (204-2) of a light valve layer (104) with a particular color (e.g., green).

In some embodiments, single color quantum dots of other colors, in addition to primary colors in the color space supported by the display system, may be disposed with or on the surface of a light guide to produce these other colors (e.g., saturated colors) in order to support a wide color gamut.

Figure 3D:
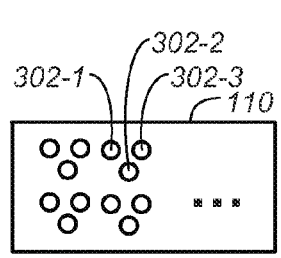
FIG. 3D and FIG. 3E illustrate a triangular pattern and a linear pattern among many possible examples of top view patterns formed by single color quantum dots, in accordance with some possible embodiments of the present invention.
Figure 3E:
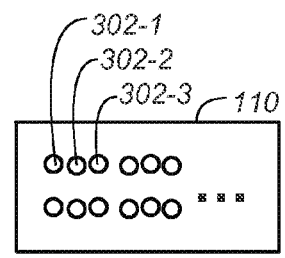

FIG. 3D and FIG. 3E illustrate a triangular pattern and a linear pattern among many possible examples of top view patterns formed by single color quantum dots, in accordance with some possible embodiments of the present invention. In various embodiments, light extracted or regenerated with these patterns may be used as a light source, or may alternatively directly render images without other light modulation layers that modulate light output on an individual pixel basis. Each circle in FIG. 3D and FIG. 3E represents an individual distribution around an optical contact area between a light extractor and a light guide. As used herein, a subset of contact areas refers to a collection of contact areas that emit second light to illuminate a common image portion (a pixel, a pixel block, a subset of pixels etc. in an image frame), wherein each individual contact area in the subset of contact areas may emit a different color light. For example, contact area 302-1 in a subset of contact areas may emit a green light, contact area 302-2 in the same subset may emit a red light, and contact area 302-3 in the same subset may emit a blue light, as determined by the types of quantum dots disposed near or at these individual contact areas, respectively. In some embodiments, individual contact areas in the same subset may emit light in a time-wise sequential manner. In some embodiments, individual contact areas in the same subset may emit light in one or more partially or completely overlapping time intervals together. In some embodiments, whether individual contact areas emit light in overlapping time intervals or not, the intensities of different color lights emitted by individual contact areas in the subset may be individually and independently controlled. For example, the intensity of the green light from contact area 302-1 may be controlled/regulated by the time duration in which the optical contact is maintained at contact area 302-1 between a portion of a light guide and a corresponding light extractor. The intensity of different color lights from different contact areas (e.g., 302-2 and 302-3) in a subset may be controlled/regulated (e.g., at the same time) to different values other than what is set for the green light, or in alternative embodiments to the same value as that of the green light. Light intensity may be controlled on a larger scale than an image portion illuminated by a subset of contact areas. For example, in some embodiments, by varying time durations of optical contacts for contact areas that illuminate an image area corresponding to more than one subset of contact areas, the light intensity on the image area may also vary. Additionally and/or alternatively, by varying the number (e.g., all, some, or none) of optical contacts for contact areas that illuminate an image area corresponding to more than one subset of contact areas, the light intensity on the image area may also vary. Additionally and/or alternatively, by varying concentrations of different types of quantum dots at or near a subset of contact areas, the light intensity on the image area for a color component may also vary.

6. 3D Display Applications

Figure 4A:
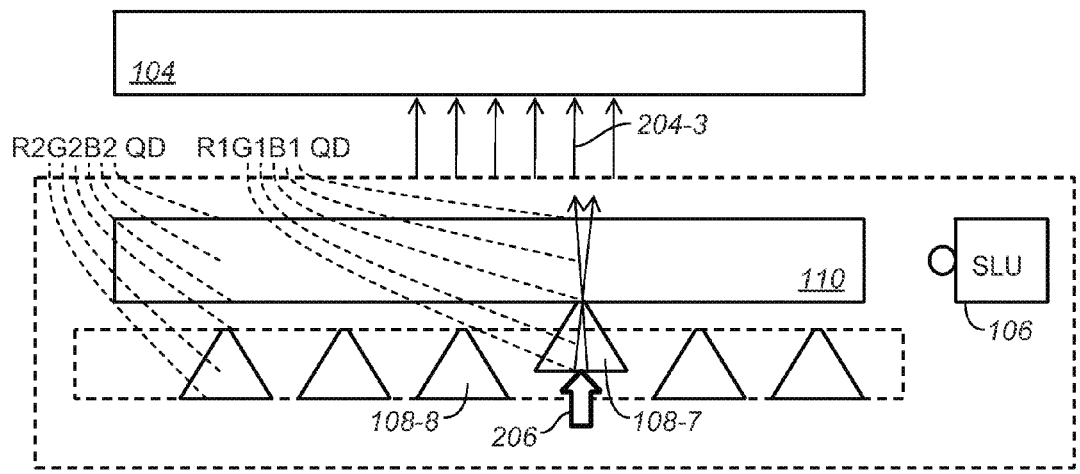
FIG. 4A illustrates an example configuration in which two or more distinct sets of quantum dots disposed with a plurality of light extractors and a light guide, in accordance with some possible embodiments of the present invention.

FIG. 4A illustrates an example configuration in which two or more distinct sets of quantum dots disposed with a plurality of light extractors (e.g., 108 of FIG. 1B) and a light guide, in accordance with some possible embodiments of the present invention. In various embodiments, light extracted or regenerated with these patterns may be used as a light source, or may alternatively directly render images without other light modulation layers that modulate light output on an individual pixel basis. In some possible embodiments, each of the two or more distinct sets of quantum dots may be configured to support all colors in a color space in a display system described herein. In some possible embodiments, a first set of quantum dots (R1G1B1 QD), among the two or more sets of quantum dots, may comprise at least three different first primary colors; a second set of quantum dots (R1G1B1 QD), among the two or more sets of quantum dots, may also comprise at least three different second primary colors. The first primary colors may, but are not limited only to, be the same as the second primary colors, for example, red, green and blue.

In some embodiments, first light wavelengths emitted by the first set of quantum dots for a specific color may be different from second light wavelengths emitted by the second set of quantum dots for the same specific color. For example, the first light wavelengths may occupy a range of wavelengths different from that of the second light wavelengths. In some embodiments, the first light wavelengths and the second light wavelengths have little or no common wavelengths. In some other embodiments, the first light wavelengths and the second light wavelengths have some common wavelengths.

In some possible embodiments, quantum dots of different colors in each distinct set of quantum dots may be distributed or disposed in an unmixed pattern with each color at or near separate optical contact areas between the light extractors and the light guide. In some other possible embodiments, as illustrated in FIG. 4A, quantum dots of different colors in each distinct set of quantum dots may be mixed. The mixed quantum dots in the set are distributed or disposed near each optical contact area between the light extractors and the light guide.

In some possible embodiments, each distinct set of quantum dots may independently support a color space comprising three or more primary colors (e.g., R, G and B as primary colors). In an example, quantum dots around a light extractor (108-3) may comprise RGB quantum dots. The composition of the mixed quantum dots may be configured to provide a white point. The white point may be D65 under Rec. 709, D50 under P3, or another type of white point (including but not limited only to a standard-based or non-standard-based white point). Second light produced with first light from a SLU (e.g., 106) upon optical contact between a light extractor (e.g., 108-7 or 108-8) and a portion of a light guide (e.g., 110) may be configured to illuminate a portion (204-3) of a light valve layer (104). In some embodiments, second light may be configured as substantially uniform illumination on the light valve layer (104). In some other embodiments, second light from the light extractors (108) may be configured to support local dimming which illuminates different portions of the light valve layer (104) differently, based on image data being rendered in the different portions of the light valve layer (104).

In some possible embodiments, the first distinct set of quantum dots that independently supports the color space may be used to generate a first image frame, while the second distinct set of quantum dots that also independently supports the color space may be used to generate a second image frame. In some possible embodiments, the first distinct set of quantum dots emits in first relatively narrow wavelength ranges, while the second distinct set of quantum dots emits in second relatively narrow wavelength ranges. The first relatively narrow wavelength ranges may have no or little common wavelength with the second relatively narrow wavelength ranges. The first image frame may be a left view image in 3 dimensional (3D) display applications, while the second image frame may be a right view image in the 3D display applications. The first image frame and the second image frame may be generated in a time-wise frame sequential manner. In some possible embodiments, a viewer may wear a pair of glasses with a left perspective configured to be transmissive for the first wavelength ranges but opaque for the second wavelength ranges, and with a right perspective configured to be transmissive for the second wavelength ranges but opaque for the first wavelength ranges. Under techniques described herein, synchronization between a viewer's glasses and an image rendering system such as a display system is not needed in 3D display applications.

Figure 4B:
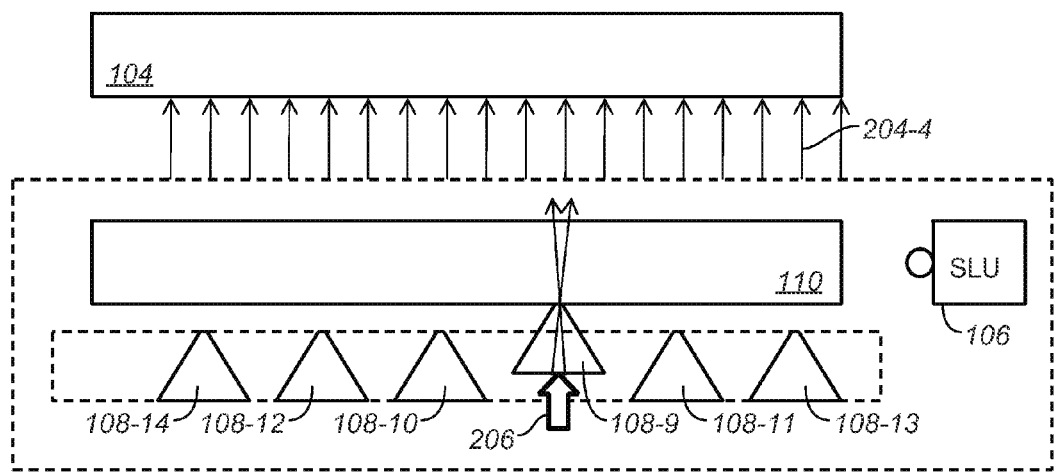
FIG. 4B illustrates an example configuration in which two or more distinct sets of quantum dots disposed with a plurality of light extractors and a light guide, in accordance with some possible embodiments of the present invention.

FIG. 4B illustrates an example configuration in which two or more distinct sets of quantum dots disposed with a plurality of light extractors (e.g., 108 of FIG. 1B) and a light guide, in accordance with some possible embodiments of the present invention. In various embodiments, light extracted or regenerated with these patterns may be used as a light source, or may alternatively directly render images without other light modulation layers that modulate light output on an individual pixel basis. In some possible embodiments, each of the two or more distinct sets of quantum dots may be configured to independently support all colors in a color space in a display system described herein.

In some possible embodiments, as illustrated in FIG. 4B, quantum dots of different colors in each distinct set of quantum dots may be distributed or disposed in an unmixed pattern with each color at or near separate optical contact areas between the light extractors and the light guide. Quantum dots disposed with a group of light extractors (e.g., 108-9 through 14) may be optically configured to illuminate the same portion (204-4) of a light valve layer (104). For example, R1 quantum dots (e.g., configured to regenerate red light) may be disposed at or near the optical contact area between a light extractor 108-14 and the light guide (110), while R2 quantum dots (e.g., also configured to regenerate red light, but in different light wavelengths than those of R1 quantum dots) may be disposed at or near the optical contact area between a light extractor 108-12 and the light guide (110). Similarly, G1 and B1 quantum dots (e.g., configured to regenerate green light and blue light, respectively) may be disposed at or near the optical contact areas between light extractors 108-10 and 108-11, respectively, and the light guide (110), while G2 and B2 quantum dots (e.g., configured to regenerate green light and blue light, respectively, but in different light wavelengths than those of G1 and B1) may be disposed at or near the optical contact areas between light extractors 108-9 and 108-13, respectively, and the light guide (110).

In some embodiments, light of all colors (e.g., R1, G1 and B1) produced by a distinct set (e.g., the first set) of quantum dots herein may be produced concurrently. For example, in the same time interval, R1, G1 and B1 may produce red, green and blue light concurrently. In some other embodiments, light of different colors (e.g., R1, G1 or B1) in a distinct set (e.g., the first set) of quantum dots may be produced in a time-wise color sequential manner. For example, in a time-wise sequence of light production, R1 may produce red light first, G1 may produce green light next, and B1 may produce blue light last.

In some embodiments, two or more different sets (e.g., the first set and the second set) of quantum dots described herein may produce second light of one, two or more colors concurrently. For example, in the same time interval, R1 in the first set and R2 in the second set may produce red light concurrently. In some other embodiments, at least two distinct set (e.g., the first set and the second set) of quantum dots may produce second light in a time-wise color sequential manner. For example, in a time-wise sequence of light production, the first set of quantum dots may produce light first, and the second set of quantum dots may produce light next. In these embodiments, second light of specific colors may or may not be concurrently produced by a distinct set (e.g., the first set or the second set) of quantum dots.

As in FIG. 4A, in FIG. 4B, the first distinct set of quantum dots that independently supports the color space may be used to generate a first image frame, while the second distinct set of quantum dots that also independently supports the color space may be used to generate a second image frame. In some possible embodiments, the first distinct set of quantum dots emits in first relatively narrow wavelength ranges, while the second distinct set of quantum dots emits in second relatively narrow wavelength ranges. The first relatively narrow wavelength ranges may have no or little common wavelength with the second relatively narrow wavelength ranges. The first image frame may be a left view image in 3 dimensional (3D) display applications, while the second image frame may be a right view image in the 3D display applications. The first image frame and the second image frame may be generated in a time-wise frame sequential manner. In some possible embodiments, a viewer may wear a pair of glasses with a left perspective configured to be transmissive for the first wavelength ranges but opaque for the second wavelength ranges, and with a right perspective configured to be transmissive for the second wavelength ranges but opaque for the first wavelength ranges. Under techniques described herein, synchronization between a viewer's glasses and an image rendering system such as a display system is not needed in 3D display applications.

7. Light Source Control Logic

Figure 5:
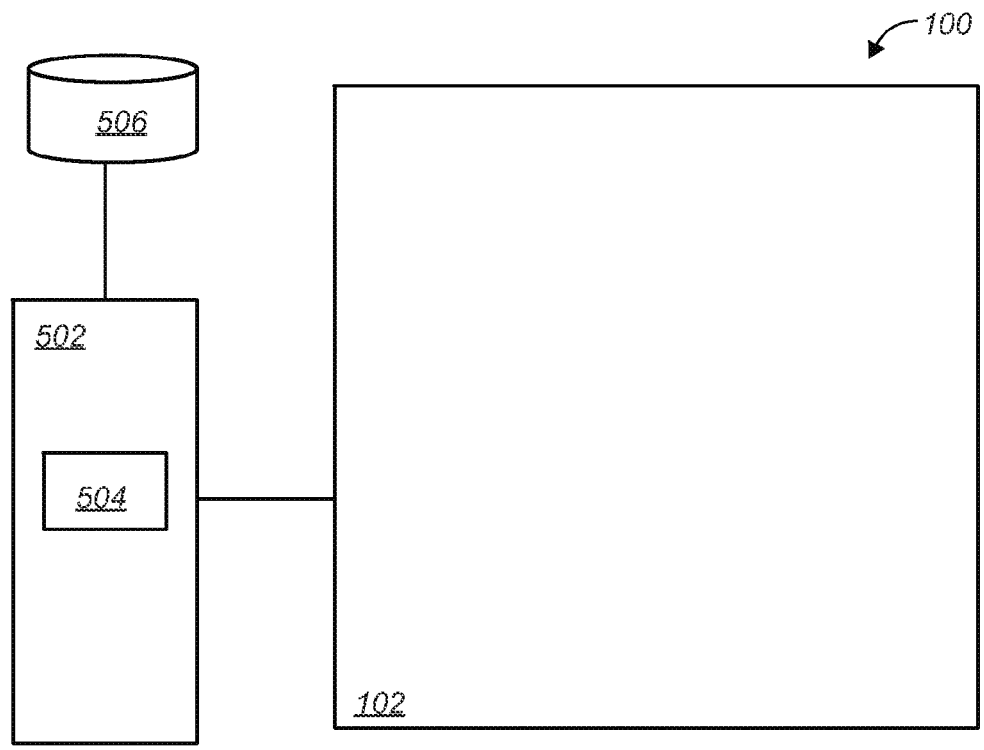
FIG. 5 illustrates an example configuration of a display system that comprises display logic, in accordance with some possible embodiments of the present invention.

FIG. 5 illustrates an example configuration of a display system (e.g., 100) that comprises display logic (502), in accordance with some possible embodiments of the present invention. In some possible embodiments, display logic 502 additionally and/or optionally may comprise light source control logic (504) configured to control component in a light source (e.g., 102) in display system 100. The display logic 502 may be operatively coupled with an image data source 506 (e.g., a set-top box, networked server, storage media or the like) and is configured to receive image data from the image data source 506. The image data may be provided by the image data source 506 in a variety of ways including from an over-the-air broadcast, or Ethernet, High-Definition Multimedia Interface (HDMI), wireless network interface, devices (e.g., set-top box, server, storage medium), etc. Image frames received from an internal or external source may be used by the display logic 502 to drive a light valve layer (e.g., 104 of FIG. 1A) in display system 100, and to drive light source 104 and components therein. For example, display logic 502 may be configured to control a subset of light extractors to make contact with a light guide (e.g., 110 of FIG. 1B) to produce second light illuminating some or all portions of the light valve layer (104). The image frames may also be used by the display logic 502 to derive individual or aggregate pixel values in various frames in various resolutions to drive individual light source components as described herein.

8. Example Process Flow

Figure 6:
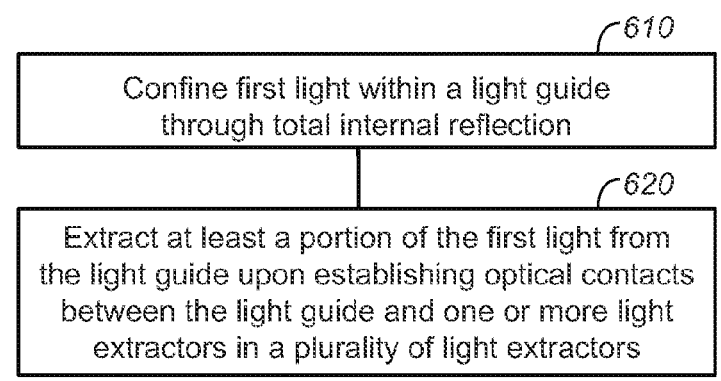
FIG. 6 illustrates an example process flow, according to a possible embodiment.

FIG. 6 illustrates an example process flow according to a possible embodiment of the present invention. In some possible embodiments, one or more computing devices or components in a display system (e.g., 500) comprising light source control logic (e.g., 504) and a light source (e.g., 102) may perform this process flow. In block 610, the display system (100) confines first light (e.g., 202) within a light guide (e.g., 110) through internal reflection. The internal reflection may be total internal reflection in some embodiments, or may be less than total internal reflection in some other embodiments. In some possible embodiments, the light guide comprises one or more of acrylic resin, polycarbonate, epoxies, or glass.

In block 620, the display system (100) extracts at least a portion of the first light (202) from the light guide (110) upon establishing optical contacts between the light guide (110) and one or more light extractors (e.g., 108-1) in a plurality of light extractors (e.g., 108). Here, at least one (e.g., 108-1) of (a) individual light extractors in the plurality of light extractors (108) or (b) portions (e.g., 110-1) of the light guide (110) is configured to be moved to cause an optical contact between a light extractor (e.g., 108-1) in the plurality of light extractors (e.g., 108) and a portion (110-1) of the light guide (110). In various embodiments, light extracted or regenerated may be used as a light source, or may alternatively directly render images without other light modulation layers that modulate light output on an individual pixel basis.

In some embodiments, an optical contact herein is made by moving the light extractor in the plurality of light extractors towards the portion of the light guide, or alternatively by moving the portion of the light guide towards the light extractor in the plurality of light extractors.

In some embodiments, the light guide (110) comprises at least two geometric shapes (210-1 and 210-2) separated by an inter-shape gap. For the purpose of the present invention, other discrete or non-discrete, perforated or non-perforated, curved or non-curved, regular or irregular shapes may be used to carry/host portions of the light guide (110).

As illustrated in FIG. 2D, in some possible embodiments, the plurality of light extractors (108) comprises a first subset of light extractors (e.g., those on a first strip 208-1 of FIG. 2D) with a first geometric shape and a second subset of light extractors (e.g., those on a first strip 208-2 of FIG. 2D) with a second geometric shape, and wherein the first geometric shape and the second geometric shape are separated by an inter-shape gap. For the purpose of the present invention, other discrete or non-discrete, perforated or non-perforated, curved or non-curved, regular or irregular shapes may be used to carry/host the plurality of light extractors (108).

As illustrated in FIG. 3D and FIG. 3E, in some embodiments, the plurality of light extractors (108) forms a plurality of groups (one of which, for example, may be formed by 302-1, 302-2 and 302-3 of FIG. 3D and FIG. 3E) of light extractors, and wherein light extractors in each group in the plurality of groups of light extractors comprise two or more light extractors (302-1, 302-2 and 302-3 of FIG. 3D and FIG. 3E) each with a different primary color. Each group in the plurality of groups of light extractors may be configured to illuminate a specific portion of a light valve layer. In some embodiments, each group in the plurality of groups of light extractors forms a linear pattern. In some embodiments, each group in the plurality of groups of light extractors forms a non-linear pattern.

In some embodiments, the plurality of light extractors (108) comprises light extractors for three or more mutually different primary colors. For example, some first light extractors may be configured to produce red color, some second light extractors may be configured to produce green color, and some light extractors may be configured to produce blue color. In some embodiments, more than four primary colors may be used. For example, in addition to the above-mentioned colors, some other light extractors in the plurality of light extractors (108) may be configured to produce light of yellow, cyan, or magenta color.

A light source described herein may or may not be a part of a display system. In embodiments in which the light source is used with a display system (e.g., 100) that supports rendering color images in a color space (e.g., a RGB color space), the plurality of light extractors (108) comprises two distinct sets (e.g., a first set of light extractors with R1G1B1 quantum dots, and a second set of light extractors with R2G2B2 quantum dots) of light extractors, each set in the two distinct sets of light extractors independently supporting the color space. A first set of light extractors (with R1G1B1 quantum dots) may be configured to be used in rendering a first image frame, while a second different set (with R2G2B2 quantum dots) in the two distinct sets of light extractors may be configured to be used in rendering a second different image frame. Here, the first image frame and the second different image frame may be rendered time sequentially and may form a 3-dimensional (3D) image.

In some embodiments, first light (202) described herein comprises at least one of invisible light or visible light. For example, at least a portion of the first light (202) may be visible blue light from blue LEDs. Alternatively and/or additionally, at least a portion of the first light (202) may be ultraviolet (UV) light.

In some embodiments, a portion of the first light (202) may be used to generate a portion of second light (204) that illuminates a portion of a light valve layer. The first light and the second light have different light wavelength compositions. For example, the extracted first light may be used to excite quantum dots disposed around an optical contact area between a light extractor and the light guide (110). The quantum dots in turn generate the second light (204) to illuminate a light valve layer (104). The second light may be visible light (e.g., white light with D65, D50, or another standard-based or non-standard-based white point).

In some embodiments, a portion of the first light (202) is extracted through one of the optical contacts, and after light extraction is directly used to illuminate a portion of a light valve layer (104).

In some embodiments, the light guide (110) is of a different refractive index than that of the light extractors (108), while in some other embodiments, the light guide (110) is of a same refractive index as that of the light extractors (108).

In some embodiments, a light extractor described herein may comprise one of a prism or a cone. In some embodiments, a light extractor described herein may be configured to redirect light towards a viewer facing surface of the light guide.

Under techniques described herein, quantum dots may be configured with a light source described herein to convert the at least a portion of first light (202) to second light (204), wherein the second light (202) illuminates a portion of a light valve layer (104). In some possible embodiments, at least a portion of the quantum dots is disposed with the light guide. In some possible embodiments, at least a portion of the quantum dots is disposed with the light extractors. In some possible embodiments, the quantum dots may be disposed with more than two optical components (e.g., the light extractors and the light guide).

In some embodiments, at least one light extractor in the plurality of light extractors comprises a surface coated with quantum dots, or embedded with quantum dots. In some embodiments, at least one portion of a light guide described herein comprises a surface area coated with quantum dots, or embedded with quantum dots.

In some embodiments, the light source is configured to exert on one of an individual light extractor or a portion of the light guide through one or more of pneumatic force, mechanical force, gravitational force, or electromagnetic field-based force.

In some embodiments, a light source described herein is configured as a back light unit in a display system. The display system may comprise light source control logic configured to determine, based on image data, which light extractors in the plurality of light extractors are to be in optical contact with the light guide. Additionally and/or optionally, the display system may comprise sampling logic configured to estimate desired illumination on a portion of a plane based on pixel values in image data.

In some embodiments, different color components of the second light illuminating an image portion of an image are individually controlled based on image data of the image. For example, intensity of a color component in the different color components of the second light illuminating the image portion is controlled by varying, based on the image data, one or more of time durations of optical contacts at one or more contact areas for the color component between the light guide and one or more corresponding light extractors, or number per unit area of optical contacts at one or more contact areas for the color component between the light guide and the plurality of light extractors.

9. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
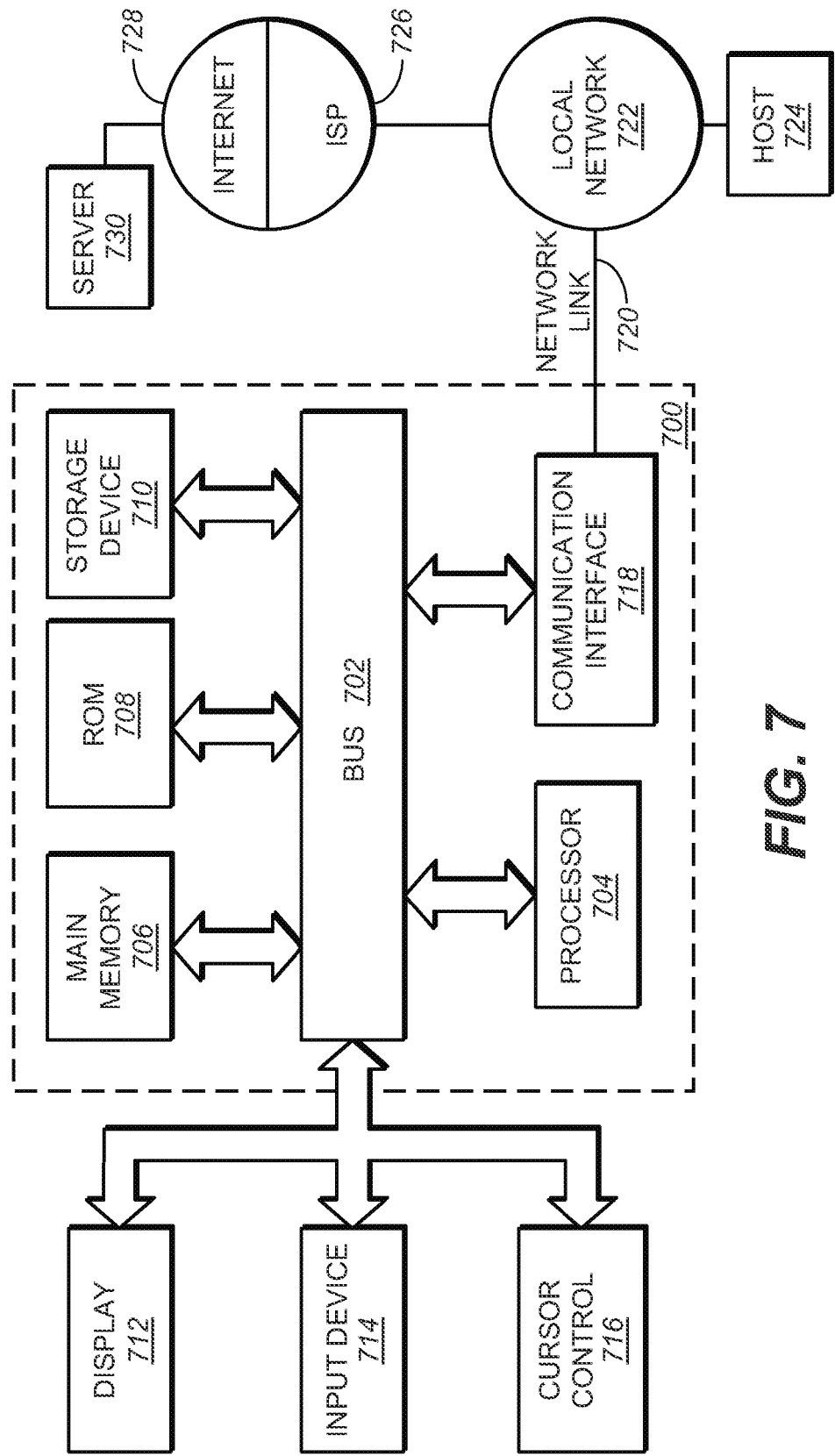
FIG. 7 illustrates an example hardware platform on which a computer or a computing device as described herein may be implemented, according a possible embodiment of the present invention.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a liquid crystal display, for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

10. Equivalents, Extensions, Alternatives and Miscellaneous

In the foregoing specification, possible embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A light source comprising:
a light guide configured to confine a first light within the light guide through internal reflection;
a plurality of light extractors configured to extract at least a portion of the first light from the light guide upon establishing at least one optical contact with the light guide;
wherein the light source is configured to move at least one of (a) individual light extractors in the plurality of light extractors or (b) portions of the light guide to cause an optical contact between a light extractor in the plurality of light extractors and a portion of the light guide,
wherein the at least one optical contact is made by moving a portion of the light guide toward at least one light extractor in the plurality of light extractors.

2. The light source of claim 1, wherein the light guide comprises at least two geometric shapes separated by an inter-shape gap.

3. The light source of claim 1, wherein the plurality of light extractors comprises a first subset of light extractors with a first geometric shape and a second subset of light extractors with a second geometric shape, and wherein the first geometric shape and the second geometric shape are separated by an inter-shape gap.

4. The light source of claim 1, wherein the plurality of light extractors forms a plurality of groups of light extractors, and wherein each group in the plurality of groups of light extractors comprises two or more light extractors each with a different primary color.

5. The light source of claim 4, wherein each group in the plurality of groups of light extractors is configured to illuminate a specific portion of a light valve layer.

6. The light source of claim 4, wherein each group in the plurality of groups of light extractors forms a linear pattern.

7. The light source of claim 4, wherein each group in the plurality of groups of light extractors forms a non-linear pattern.

8. The light source of claim 1, wherein the plurality of light extractors comprises light extractors for three or more mutually different primary colors.

9. The light source of claim 1, wherein the light source is a part of a display system that supports rendering color images in a color space, and wherein the plurality of light extractors comprises two distinct sets of light extractors, each set in the two distinct sets of light extractors independently supporting the color space.

10. The light source of claim 9, wherein a first set of light extractors is configured to be used in rendering a first image frame, and wherein a second different set in the two distinct sets of light extractors is configured to be used in rendering a second different image frame.

11. The light source of claim 10, wherein the first image frame and the second different image frame are rendered time sequentially and form a 3-dimensional (3D) image.

12. The light source of claim 1, wherein the first light comprises at least one of invisible light or visible light.

13. The light source of claim 1, wherein the at least a portion of the first light is used to generate a portion of second light that illuminates a portion of a light valve layer, and wherein the first light and the second light have different light wavelength compositions.

14. The light source of claim 13, wherein the second light is visible light.

15. The light source of claim 1, wherein a portion of the first light is extracted through one of the at least one optical contact, wherein the portion of the first light after light extraction is directly used to illuminate a portion of a light valve layer.

16. The light source of claim 1, wherein the light guide is of a different refractive index than that of the light extractors.

17. The light source of claim 1, wherein the light guide is of a same refractive index as that of the light extractors.

18. The light source of claim 1, wherein at least one light extractor in the plurality of light extractors comprises one of a prism or a cone.

19. The light source of claim 1, wherein at least one light extractor in the plurality of light extractors is configured to redirect light towards a viewer facing surface of the light guide.

20. The light source of claim 1, further comprising quantum dots configured to convert the at least a portion of the first light to second light, wherein the second light illuminates a portion of a light valve layer.

21. The light source of claim 20, wherein at least a portion of the quantum dots is disposed with the light guide.

22. The light source of claim 20, wherein at least a portion of the quantum dots is disposed with the light extractors.

23. The light source of claim 1, wherein at least one light extractor in the plurality of light extractors comprises a surface coated with quantum dots.

24. The light source of claim 1, wherein at least one light extractor in the plurality of light extractors is embedded with quantum dots.

25. The light source of claim 1, wherein the light source is part of a display system that includes a light valve layer, and wherein at least one portion of the light guide comprises a surface area coated with quantum dots.

26. The light source of claim 1, wherein the light source is part of a display system that includes a light valve layer, and wherein at least one portion of the light guide is embedded with quantum dots.

27. The light source of claim 1, wherein the light source is configured to exert on one of an individual light extractor or a portion of the light guide through one or more of pneumatic force, mechanical force, gravitational force, or electromagnetic field-based force.

28. The light source of claim 1, wherein the light source is configured as a back light unit in a display system.

29. The light source of claim 28, wherein the display system comprises light source control logic configured to determine, based on image data, which light extractors in the plurality of light extractors are to be in optical contacts with the light guide.

30. The light source of claim 18, wherein the display system comprises sampling logic configured to estimate desired illumination on a portion of a plane based on pixel values in image data.

31. The light source of claim 1, wherein the light guide comprises one or more of acrylic resin, polycarbonate, epoxies, or glass.

32. The light source of claim 1, wherein different color components of the second light illuminating an image portion of an image are individually controlled based on image data of the image.

33. The light source of claim 32, wherein intensity of a color component in the different color components of the second light illuminating the image portion is controlled by varying, based on the image data, one or more of (a) time durations of optical contacts at one or more contact areas for the color component between the light guide and one or more corresponding light extractors, (b) number per unit area of optical contacts at one or more contact areas for the color component between the light guide and the plurality of light extractors, or (c) individual concentrations of quantum dots in the contact points for each of different color components of the second light between the light guide and the plurality of light extractors.

34. A method, comprising:
confining first light within a light guide through internal reflection;
extracting at least a portion of the first light from the light guide upon establishing optical contacts between the light guide and one or more light extractors in a plurality of light extractors;
wherein at least one of (a) individual light extractors in the plurality of light extractors or (b) portions of the light guide is configured to be moved to cause an optical contact between a light extractor in the plurality of light extractors and a portion of the light guide, wherein the optical contacts are made by moving a portion of the light guide toward the one or more light extractor in the plurality of light extractors.

35. An apparatus comprising a processor and configured to perform the method recited in claim 34.

36. A non-transitory computer readable storage medium, comprising software instructions, which when executed by one or more processors cause performance of the methods recited in claim 34.

37. A computing device comprising one or more processors and one or more storage media storing a set of instructions which, when executed by the one or more processors, cause performance of the method recited in claim 34.

* * * * *